(12) United States Patent
Zaragoza Labes et al.

(10) Patent No.: US 10,570,719 B2
(45) Date of Patent: Feb. 25, 2020

(54) INTEGRATED COMPACT STATION OF SUBSEA SEPARATION AND PUMPING SYSTEMS

(71) Applicant: FMC TECHNOLOGIES DO BRASIL LTDA, Rio de Janeiro (BR)

(72) Inventors: Alan Zaragoza Labes, Rio de Janeiro (BR); Heloisa Helena da Silva Folhadella, Niteroi (BR); Hermes Machado, Rio de Janeiro (BR); Andréa Souza Carvalho, Niteroi (BR)

( * ) Notice: Subject to any disclaimer, the term of this patent is extended or adjusted under 35 U.S.C. 154(b) by 0 days.

(21) Appl. No.: 15/752,857

(22) PCT Filed: Aug. 9, 2016

(86) PCT No.: PCT/BR2016/050187
§ 371 (c)(1),
(2) Date: May 29, 2018

(87) PCT Pub. No.: WO2017/027943
PCT Pub. Date: Feb. 23, 2017

(65) Prior Publication Data
US 2018/0274351 A1  Sep. 27, 2018

(30) Foreign Application Priority Data
Aug. 14, 2015  (BR) .......................... 1020150196423

(51) Int. Cl.
*E21B 43/36* (2006.01)
*E21B 43/40* (2006.01)
*B01D 17/02* (2006.01)

(52) U.S. Cl.
CPC .......... *E21B 43/36* (2013.01); *B01D 17/0217* (2013.01); *E21B 43/40* (2013.01)

(58) Field of Classification Search
CPC ...... B01D 17/0217; E21B 43/36; E21B 43/40
See application file for complete search history.

(56) References Cited

U.S. PATENT DOCUMENTS

| 5,711,374 A | 1/1998 | Kjos |
| 2003/0168391 A1* | 9/2003 | Tveiten ................... B04C 5/26 |
| | | 210/188 |

(Continued)

FOREIGN PATENT DOCUMENTS

| EP | 1353038 A1 | 10/2003 |
| WO | 98/20233 A2 | 5/1998 |

(Continued)

OTHER PUBLICATIONS

International Search Report of the International Searching Authority issued in PCT/BR2016/050187 dated Nov. 25, 2016 (3 pages).

(Continued)

*Primary Examiner* — James G Sayre
(74) *Attorney, Agent, or Firm* — Osha Liang LLP

(57) ABSTRACT

An integrated compact station of subsea separation and pumping systems of fluids, which is suitable for use in any subsea system, that is for the separation of fluids and/or solids. The compact integrated station includes a first separation module and a second pumping module of reinjection water, and a harp as a gas-liquid gravitational separator. Additionally, the compact integrated station includes a robotic arm installed on a cover involving said first separation module and a liquid-liquid gravitational tubular separator module. The integrated compact station may be applied to any subsea system of separation of fluids connected to the well of oil and gas production, or alternatively, installed directly connected to the production manifold.

13 Claims, 2 Drawing Sheets

(56) References Cited

U.S. PATENT DOCUMENTS

| | | | |
|---|---|---|---|
| 2004/0140099 A1* | 7/2004 | Hauge | E21B 43/34 |
| | | | 166/357 |
| 2004/0140124 A1 | 7/2004 | Fenton et al. | |
| 2004/0200621 A1 | 10/2004 | Ostergaard | |
| 2004/0244983 A1* | 12/2004 | Appleford | E21B 43/36 |
| | | | 166/357 |
| 2005/0145388 A1* | 7/2005 | Hopper | B01D 17/0217 |
| | | | 166/357 |
| 2005/0173322 A1* | 8/2005 | Ostergaard | B01D 17/00 |
| | | | 210/170.11 |
| 2010/0212492 A1* | 8/2010 | Miotto | B01D 19/0036 |
| | | | 95/22 |
| 2011/0203460 A1* | 8/2011 | Skofteland | E21B 43/36 |
| | | | 96/408 |
| 2013/0092633 A1* | 4/2013 | Abrand | B01D 17/0208 |
| | | | 210/747.6 |
| 2015/0034570 A1 | 2/2015 | Andreussi | |
| 2018/0093203 A1* | 4/2018 | Husveg | B01D 17/02 |

FOREIGN PATENT DOCUMENTS

| | | |
|---|---|---|
| WO | 03/078793 A1 | 9/2003 |
| WO | 2010/005312 A1 | 1/2010 |
| WO | 2015/095886 A1 | 6/2015 |

OTHER PUBLICATIONS

Written Opinion of the International Searching Authority issued in PCT/BR2016/050187 dated Nov. 25, 2016 (6 pages).
International Preliminary Report on Patentability from PCT/BR2016/050187 completed on Nov. 6, 2017 (31 pages).

* cited by examiner

INTEGRATED COMPACT STATION OF SUBSEA SEPARATION AND PUMPING SYSTEMS

FIELD OF APPLICATION

The present invention relates to an integrated compact station of subsea separation and pumping systems of fluids, which is suitable for application in any subsea system that has as objective the separation of fluids and/or solids.

PRIOR ART

The fluid produced by the oil tanks typically contains a mixture of hydrocarbons, gas and oil, together with water and sand. The production curve of an oil well describes, over the time, a significant reversal with which the fractions of the fluid components are produced. It is known that the initial stage of production of an oil well is the period in which it is obtained the largest fraction of the oil, more profitable component, while the fraction of produced water presents its lowest percentage. However, in the course of the well life and the need to make use of water injection into aquifers tanks to maintain the pressure of production tank, the fraction of water, that was minimal, increases significantly reaching majority fraction levels of production. In this scenario, the capabilities of surface facilities for primary separation and water treatment can reach its maximum capacity and usually be exceeded.

Separation of fluids produced by the oil tank is typical activity of surface facilities of a production platform. Several processing steps are necessary to be able to bring the oil to the minimum requirements of solids content, water and salts to their export or so it can be delivered at the refinery.

In addition, treatment of the water produced by the tank also requires various solids separation steps and maximum content of oil in order to be suitable for disposal at sea, within the environmental specifications required by legislation. Likewise, it occurs with gas and sand.

To this end, large modules composing equipment, piping, sensors and structures are designed so as to include all the necessary functions for the individual processing of each phase produced by oil tank. These modules usually occupy, in its entirety, the surface facilities. Thus, any expansion necessary to adjust the treatment system to a new operation condition requires space, high investment and often, the processing plant stopping for its suitability. These three items usually establish impeditive conditions to occur a significant expansion in oil production.

Nevertheless, it is typical the scenario in which an estimate of production curve does not reflect the actual production, which means the production of volumes of water, oil, gas and sand higher or lower than the capacity of treatment equipment, implying, for example, loss of water quality for disposal. If this occurs, there is no permission from environmental agencies to dispose of water. In such a situation, a commonly adopted alternative is to transport water through shuttle tanker to land facilities, where there will be the completion of treatment and subsequent disposal of water. It happens that this procedure significantly increases the operational costs of the production platform.

Subsea systems of three-phase or biphasic separation are already known in the oil industry, examples of these systems described generally in the documents WO 03/078793A1, US 2004/140124A1, US 2004/200621A1, WO 2010/005312A1, WO 2015/095886A1, US 2015/034570A1, WO 98/20233A2, U.S. Pat. No. 5,711,374A and EP 1353038A1.

The subsea separation of fluid produced by the oil tank is motivated by important advantages when compared to fluid separation typically used in production platforms. For example, there is the possibility of creating spaces in the platform by replacing the fluid separation equipment by those now on the seabed. There is also the possibility of increasing the recovery factor of the tank production by reducing charge loss, obtained by separation and re-injection of water produced in the oil tank on the seabed. It also provides for reducing the percentage of water transported to the surface, the disengagement of the transport pipelines of tank production to the platform, the storage tanks and the platform processing plant equipment intended for the water treatment. It should be added also the obtaining of significant reduction of operational costs related to the water treatment in surface.

For the above listed reasons, several subsea systems of separation of fluid with different purposes have been employed in the oil industry. One of the pioneers is the three-phase subsea separation system, of Troll field in Norway. The purpose of this system constitutes on the need to remove large volumes of water produced by the tank and reinjected them through submerged centrifugal pumping to direct the separated water to the target aquifer tank. Another application of subsea systems of three-phase separation is Water-Oil Subsea Separator pilot, SSAO, applied to the Marlim field, in Brazil.

However, several challenges are involved in projects of subsea systems of separation. The selection of equipment considering the operational conditions and requirements demanded for qualifying the injection water is important requirement for the performance required for separation. The accurate estimate of the operational package of separation system that will run for approximately 20 years is crucial for the proper selection and dimensioning of the equipment, operational modes and system control.

As is known, the engineering practice requires that safety factors are adopted in the sizing of separation equipment. However, if the estimate of the production curve has a significant deviation of actual production, it is very likely that the equipment will not provide the performance desired by the project. In this scenario, operate the machine away from its specifications incurs a likely impossible to control unforeseen disturbances or even achieve the desired requirements of water quality.

It is also known that in the design phase, the sizing, the final weight of the system and the amount of components are the parameters that will define the cost of construction and installation of the system. The higher these parameters, the greater the overall cost of subsea system of fluid separation, thus making it unattractive.

It occurs analogously with the cost of intervention that, the higher the weight of the system and its packages, the greater the capacity of the craft required for installation and/or intervention of modules. The intervention of a subsea system may cause several implications, such as high cost of intervention service and possible system downtime if there is no spare for immediate replacement of undersized or oversized item.

SUMMARY OF THE INVENTION

Therefore, it is one of the objectives of the present invention to provide a solution of subsea separation system, compact, with integrated functionalities and modularization.

Another objective of the present invention is to provide a solution of subsea separation system which provides, concomitantly, intervention located in lightweight modules, sizing reduction and significant reduction of weight.

Another objective of the present invention is to provide a solution of subsea separation system which provides best cost-benefit ratio for its acquisition.

These and other objectives will be achieved with the integrated compact station of subsea separation and pumping systems of fluids of the present invention, which is suitable for application in any subsea system that has as objective the separation of fluids and/or solids and pumping.

BRIEF DESCRIPTION OF THE DRAWINGS

To provide a perfect understanding of the present invention, as well as its foundations, we will describe below the schematic figures attached, which serve only as non-limiting illustration of the scope of the present invention. These figures represent.

DETAILED DESCRIPTION OF THE INVENTION

Figure 1:
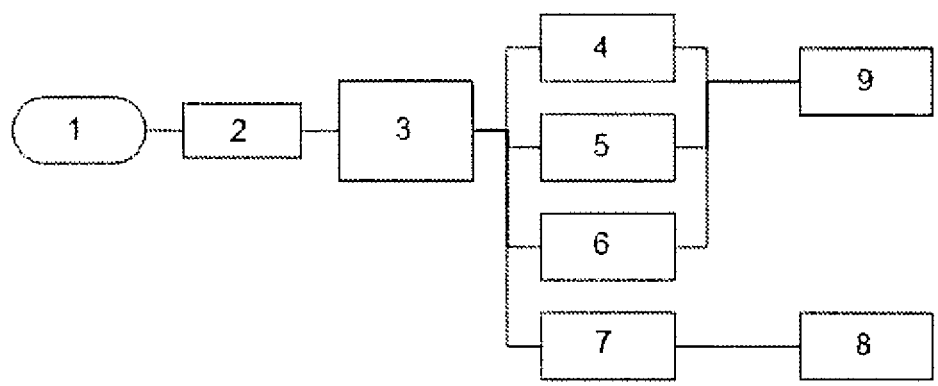
FIG. 1 is a diagram of functional blocks of subsea separation system.

FIG. 1 illustrates one of the processing steps of oil obtained from reservoirs or subsea wells, according to the separation system traditionally used and discussed above. In this diagram, we see the typical functionalities of separation of fluids on the subsea system. This system is also applicable in scenarios where the gas and oil fractions must be exported separately or even when appropriate to whatever may be the exporting needs of produced fractions combined or not.

Thus, it is seen that in a production well (1), the oil is collected (2) and forwarded to the separation subsea system (3). In this, it is subjected to mechanical, physical, chemical operations and/or combinations thereof, in order to separate the gas (4), oil (5), sand (6) and water (7) fraction. This processing can include many different parameters in order to achieve the best possible efficiency, both in regard to the quality of the produced oil (5) and the water (7) to be discarded in the environment for reinjection into the tank (8). The gas (4), oil (5) and sand (6) fractions are forwarded, by suitable means, to the surface or topside (9), which will receive additional required treatments, while water (7) is generally reinjected in the oil tank.

In order to perform these operations optimally and affording high quality of water to be discharged into the environment, the integrated compact station of subsea separation and pumping systems of fluids of the present invention has concept of modular arrangement for located intervention in equipment and integration of components for compacting and reducing sizing and weight of the modules, thus composing an improved subsea system of three-phase separation of fluids and pumping.

Figure 2:
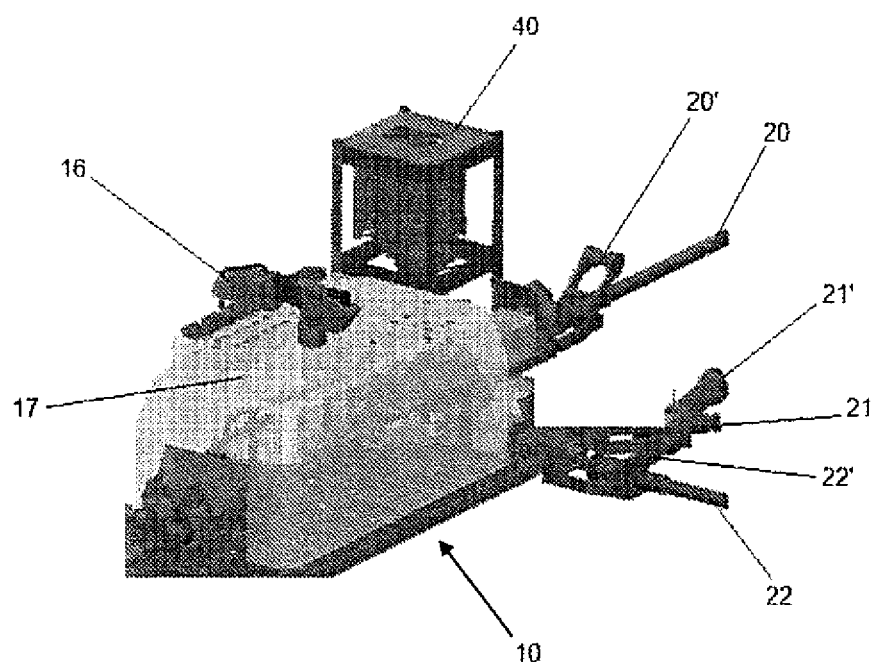
FIG. 2 is a perspective view of a first conception of the integrated compact station of subsea separation and pumping systems of fluids of the present invention.
Figure 3:
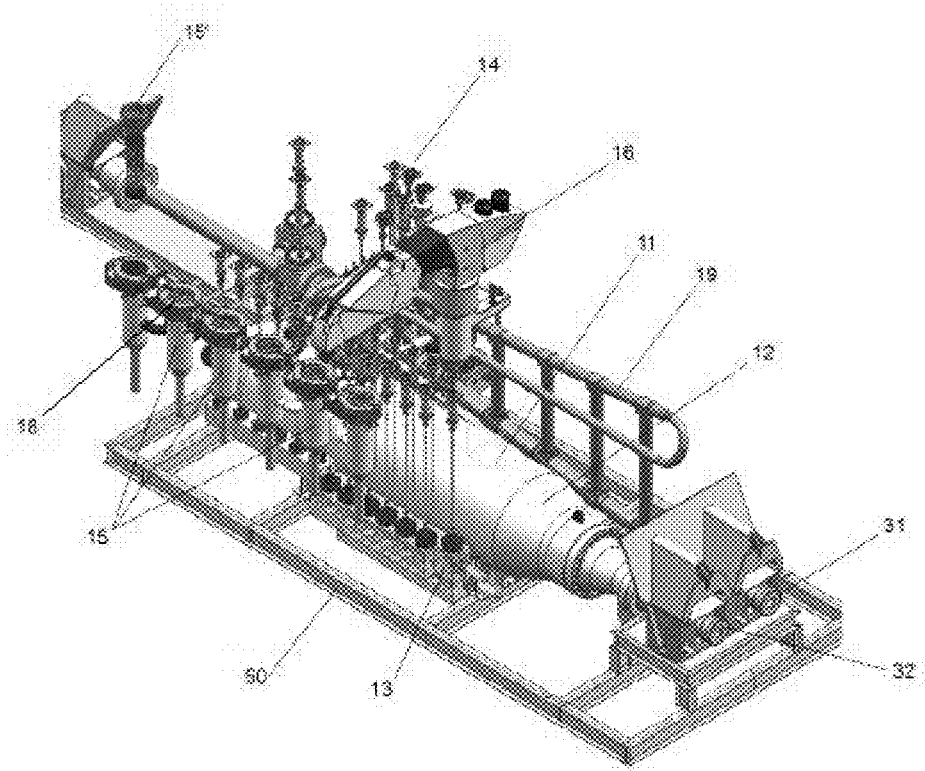
FIG. 3 is a perspective view of the integrated compact station of subsea separation and pumping systems of fluids of FIG. 2, illustrating details of the assembly of its components.
Figure 4:
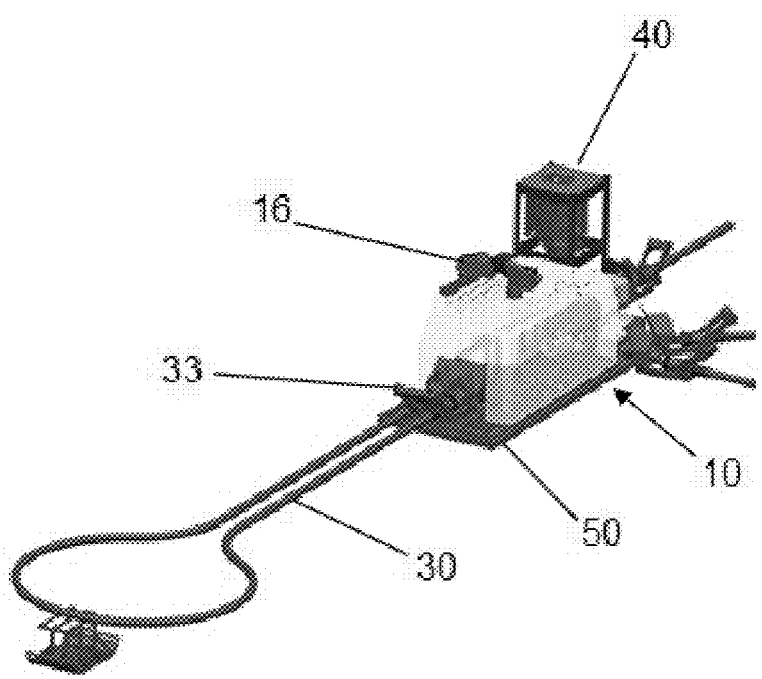
FIG. 4 is a perspective view of a second configuration of the integrated compact station of subsea separation and pumping systems of fluids of the present invention.

FIGS. 2 and 3 illustrate a first configuration of the integrated compact station of subsea separation and pumping systems of fluids according to the invention. Accordingly, it is observed that modularization composing the station comprises only two modules, being a first separation module (10) and a second pumping module of reinjection water (40).

The separation module (10) comprises a separator vessel of oil and water (11) having trunk-conical portion (12), which is along a set of integrated blocks of the gate valves (13), a set of control valves or chokes (14) positioned on the opposite side and bank of cyclonic devices (15), such as hydrocyclones, contiguous to said block of gate valves (13). At least one cyclonic separator of sand or sand trap (15') is provided in the separation module input (10).

In the upper portion, said first separation module (10) comprises a robotic arm (16) installed on a cover (17) that surrounds and thereby protects said separation module (10). The robotic arm (16) operates in the valves (13, 14) in replacement of electrical or hydraulic actuators of the prior art.

It will be appreciated that the integration of components in the separation subsea station of the present invention is carried out by integration of said gate valves (13) and control valves and/or chokes (14) in singular forged blocks, minimizing and/or eliminating the use of pipes to and interconnection of equipment, as well as input and output of the separation system. Thus it is ensured the elimination of components and thereby reduces the length and weight of the station.

The removal of residual oil is carried out by bank of hydrocyclones (15) that are designed with a limited amount of removable liners (18). The design of said bank of cyclonic devices (15) provides greater flexibility with respect to the increase and decrease of treatment capacity in relation to input flow in the system. Therefore, with such modularization, it is possible to select the amount of hydrocyclones that are sufficient to treat the water produced by scaling covering a staggering, for example, of 1:10 in cubic meters/hour. The use of hydrocyclones with removable liners facilitates the system maintenance.

The pumping module (40) remains positioned in the proximal region of the oil production reservoir being intended for reinjection of water produced by separation module (10). More broadly, it is entirely possible to include pumping modules for artificial lift of fluids produced by inclusion of multiphase pumping module (not illustrated). For the same, it is also possible the individual intervention in pumping module (40). Further, similarly, it is possible to predict a line dedicated to the exclusive gas separation, comprising three possible outputs of the system with the major fraction of the following fluid: water for reinjection (8) in the tank (1), oil (5) with or without sand (6), for surface facilities (9), and gas (4) also for surface facilities (9).

The separation module (10) further comprises a harp as gravitational gas-liquid separator (19), or other device for primary separation of gas, positioned oppositely to the bank of hydrocyclones (15), which performs the processing of gas separation that will be sent to topside (9).

The feed of integrated compact separation subsea station according to the present invention receives the production from the oil tank directly into the separation module (10) via a pipe (20), while the reinjection water produced in said module (10) is directed to the tank (1) through a pipe (21). In addition, said module (10) has a pipe (22) of topside return, through which the sending of oil and gas to the surface (9) occurs. Said pipes (20, 21, 22) are connected to the separation module (10) by respective horizontal connectors (20', 21', 22').

It is also observed that the first separation module (10) and the second pumping module of reinjection water (40) are mounted on a support structure (50), preferably metallic, for the accommodation of the whole set of the station on the seabed.

Alternatively and optionally, the three-phase separation station and pumping system according to the present invention may comprise a liquid-liquid gravitational tube separator module (30) like the system Pipe Separator®.

The liquid-liquid gravitational tubular separator module (30) is individually removable and is located outside the separation module (10), but connected to it by pipes (31, 32) and double connector (33). This second alternative arrangement aims to provide a significant reduction in weight and length of the subsea station of separation of fluids according to the present invention. In this alternative, the separator tube (30) is usually the equipment of significant length and its sizing is critical to the good performance of liquid-liquid separation. Furthermore, this modularization, besides providing compaction, enables the intervention located on the equipment if necessary.

Those skilled in the art will appreciate that the integrated compact station of subsea separation and pumping systems of fluids according to the present invention provides a series of improved effects and advantages of design and structural arrangement, among which are highlighted:
- compact subsea system basically consisting of three modules;
- modularization of the separator tube, allowing its independent location of the separation station module;
- use of larger number of cyclonic devices (or hydrocyclone) with less liners, for example, approximately 25 liners contained in approximately 6 hydrocyclones to obtain greater adjustment flexibility in water treatment capacity for reinjection;
- use of cyclonic devices for sand separation.
- integration of all gate valve bodies, control valves and/or chokes, minimizing the use of pipes to interconnect the equipment;
- use or not, of robotic arm for actuation of valves, minimizing and/or eliminating the need for individual hydraulic or electric actuation by valve, which reduces the amount of system components.
- provide, concurrently, intervention located in low-weight modules, sizing reduction and significant reduction of weight;
- provide solution of subsea separation system with better cost-benefit ratio for its acquisition.

Additionally, those skilled in the art will also appreciate the fact that the integrated compact station of subsea separation and pumping systems of fluids according to the present invention can be applied to any subsea system of separation of fluid connected to the oil and gas production well, typically, or connected directly to the production manifold.

The invention claimed is:

1. An integrated compact station of subsea separation and pumping systems of fluids, comprising:
   a first separation module and a second pumping module of a reinjection water,
   the first separation module comprising:
   a bank of cyclonic devices;
   a harp as a gas-liquid gravitational separator positioned oppositely to the bank of cyclonic devices, said harp configured to process a gas separation sent to a topside; and
   a separator vessel of oil and water, which is along a set of integrated blocks of gate valves, a set of control valves or chokes positioned on an opposite side and the bank of cyclonic devices contiguous to said block of the gate valves,
   wherein the separator vessel of oil and water is between the bank of cyclonic devices and the harp.

2. The integrated compact station of claim 1, further comprising at least a cyclonic separator of sand or sand trap provided in an input of said first separation module.

3. The integrated compact station of claim 1, further comprising a robotic arm installed on a cover involving said first separation module.

4. The integrated compact station of claim 3, wherein said robotic arm acts on gate valves and control valves replacing electrical or hydraulic actuators.

5. The integrated compact station of claim 1, wherein said gate valves and control valves and/or chokes are in singular forged blocks.

6. The integrated compact station of claim 1, wherein said cyclonic devices are designed with a limited amount of removable liners.

7. The integrated compact station of claim 1, wherein said second pumping module is positioned in a proximal region of an oil production tank configured for the reinjection water produced by first separation module.

8. The integrated compact station of claim 1, further comprising a feed pipe, a water reinjection pipe, a topside return pipe, wherein the feed pipe, the water reinjection pipe, and the topside return pipe being connected to the first separation module by respective horizontal connectors.

9. The integrated compact station of claim 1, wherein the first separation module and the second pumping module of the reinjection water are mounted on an accommodation support structure of a whole set of the integrated compact station on a seabed.

10. The integrated compact station of claim 1, further comprising a liquid-liquid gravitational tubular separator module.

11. The integrated compact station of claim 10, wherein said liquid-liquid gravitational tubular separator module is individually removable and is located outside of the first separation module and connected to the first separation module by pipes and a double connector.

12. The integrated compact station of claim 1, wherein the integrated compact station is applied to any subsea system of separation of fluids connected to a well of oil and gas production.

13. The integrated compact station of claim 1, wherein the integrated compact station is installed directly to a production manifold.

* * * * *